US009005846B2

(12) United States Patent
Mougin et al.

(10) Patent No.: US 9,005,846 B2
(45) Date of Patent: Apr. 14, 2015

(54) SUBSTRATE MADE OF POROUS METAL OR METAL ALLOY, PREPARATION METHOD THEREOF, AND HTE OR SOFC CELLS WITH A METAL SUPPORT COMPRISING THIS SUBSTRATE

(75) Inventors: Julie Mougin, Pontcharra (FR); Thomas Pietri, Bourgoin-Jallieu (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 647 days.

(21) Appl. No.: 13/128,865

(22) PCT Filed: Nov. 12, 2009

(86) PCT No.: PCT/EP2009/065080
§ 371 (c)(1),
(2), (4) Date: Aug. 10, 2011

(87) PCT Pub. No.: WO2010/055111
PCT Pub. Date: May 20, 2010

(65) Prior Publication Data
US 2011/0287340 A1 Nov. 24, 2011

(30) Foreign Application Priority Data
Nov. 12, 2008 (FR) ...................... 08 57664

(51) Int. Cl.
*H01M 8/04* (2006.01)
*H01M 4/64* (2006.01)
(Continued)

(52) U.S. Cl.
CPC ............... *H01M 8/1286* (2013.01); *C25B 9/00* (2013.01); *H01M 4/861* (2013.01); *H01M 8/0232* (2013.01); *H01M 8/0245* (2013.01); *Y02E 60/521* (2013.01); *Y02E 60/525* (2013.01)

(58) Field of Classification Search
CPC ............ H01M 8/0258; H01M 8/0228; H01M 8/0206; H01M 8/0247
USPC .......... 429/514, 517, 519, 522, 508; 204/242; 419/2
See application file for complete search history.

(56) References Cited

U.S. PATENT DOCUMENTS 6,228,521 B1 5/2001 Kim
6,605,316 B1 8/2003 Visco
(Continued)

FOREIGN PATENT DOCUMENTS

EP 1353394 A1 10/2003
EP 1760817 A 3/2007
(Continued)

OTHER PUBLICATIONS

Alava, I et al., Development of metal supported SOFC technology in Ikerlan, Meeting abstracts—207the meeting of the electrochemical society—meeting abstracts 2005 electrochemical society Inc., 2005, p. 811, US.
(Continued)

*Primary Examiner* — Barbara Gilliam
*Assistant Examiner* — Angela Martin
(74) *Attorney, Agent, or Firm* — Knobbe Martens Olson & Bear LLP

(57) ABSTRACT

A partly oxidized substrate is disclosed. According to one aspect, the substrate is formed by subjecting a substrate made of a porous metal or metal alloy including particles of at least one metal or metal alloy bound by sintering. The substrate includes a first main surface and a second main surface. The porosity of the substrate gradually changes from the first main surface to the second main surface. The substrate is partially oxidized by an oxidizing gas such as oxygen and/or air. A method for preparing the substrate and high temperature electrolyzer (THE) cell including the substrate are also disclosed.

29 Claims, 7 Drawing Sheets

(51) Int. Cl.
*H01M 4/66* (2006.01)
*H01M 2/14* (2006.01)
*C25B 9/00* (2006.01)
*C25C 7/00* (2006.01)
*C25D 17/00* (2006.01)
*H01M 8/12* (2006.01)
*H01M 4/86* (2006.01)
*H01M 8/02* (2006.01)

(56) References Cited

U.S. PATENT DOCUMENTS

| | | |
|---|---|---|
| 7,163,713 B2 | 1/2007 | Jacobson |
| 2003/0021900 A1 | 1/2003 | Jacobson |
| 2003/0175439 A1 | 9/2003 | Jacobson |
| 2006/0251947 A1 | 11/2006 | Carter |
| 2007/0072070 A1* | 3/2007 | Quek et al. .................. 429/149 |
| 2008/0206616 A1 | 8/2008 | Atanassova |

FOREIGN PATENT DOCUMENTS

| | | |
|---|---|---|
| GB | 2386126 A | 9/2003 |
| GB | 2400723 A | 10/2004 |
| WO | WO 02/27846 A | 4/2002 |
| WO | WO 02/35628 A | 5/2002 |
| WO | WO 03/107455 A | 12/2003 |
| WO | WO 2004/012287 | 2/2004 |
| WO | WO 2006/082057 A2 | 8/2006 |
| WO | WO 2007/025762 | 3/2007 |
| WO | WO 2007/105096 | 9/2007 |
| WO | WO 2008/048445 | 4/2008 |

OTHER PUBLICATIONS

Antepara, I. et al., Evaluation of ferritic steels for use as interconnects and porous metal supports in IT-SOFCs, Journal of power sources, Oct. 10, 2005, pp. 103-107, vol. 151, Elsevier, Amsterdam, NL.
Ceres Power Ltd., "Development of innovative metal supported IT-SOFC Technology", DTI report F/01/00277/REP, 2005.
Christiansen, N. et al., Solid oxide fuel cell development at Topsoe Fuel Cell and Riso, Fuel Cells Bulletin, Aug. 2006, p. 12-15.
Christiansen, N. et al., Solid Oxide Fuel Cell Research and Development at Topsoe Fuel Cell A/S and Riso/DTU, SOFC Solutions, Jul. 1, 2008, pp. 1-13, Lyngby, Denmark.
French Search Report for priority French patent application FR 0857664 mailed Feb. 23, 2009, 7 pages.
Greene, E.S. et al., Mass transfer in graded microstructure solid oxide fuel cell electrodes, Journal of Power Sources, Oct. 20, 2006, pp. 225-231, vol. 161, No. 1, Elsevier, Amsterdam, NL.
Hui, Rob et al. High Performance Metal-Supported SOFCs, National Research Council of Canada, Jul. 2, 2008, pp. 1-11.
International Search Report for PCT/EP2009/065080 dated Jan. 18, 2010 in 7 pages.
Liu, Y. et al., Nanostructured and functionally graded cathodes for intermediate-temperature SOFCs, Fuel Cells Bulletin, Elsevier Advanced Technology, Oct. 1, 2004, pp. 12-15, vol. 2004 No. 10, Kidlington, GB.
Molin, Sebastian et al. Evaluation of porous 430L stainless steel for SOFC operation at intermediate temperatures, Oct. 2, 2007, pp. 31-37 Poland.
Szabo, Patric et al., Measurement of High Temperature Leak Rates on Vacuum-Plasma-Sprayed SOFC Electrolytes, 2006, pp. 1-9.
Szabo, Patric et al., Status and Progress in Development of Metal-Supported Light-Weight SOFC for Mobile Application, Stack and Cell Design, Jul. 2, 2008, pp. 1-9.
Tsipis, Ekateriana V. et al., Electrode materials and reaction mechanisms in solid oxide fuel cells: a brief review; I. Performance-determining factors, Journal of Solid State electrochemistry; current research and development in science and technology, Nov. 27, 2007, pp. 1039-1060, vol. 12, No. 9, Springer, Berlin, DE.
Tsipis, Ekateriana V. et al., Electrode materials and reaction mechanisms in solid oxide fuel cells: a brief review; II. Electrochemical behavior vs. materials science aspects, Journal of Solid State electrochemistry; current research and development in science and technology, Jul. 11, 2008, pp. 1367-1391, vol. 12, No. 11, Springer, Berlin, DE.
Tucker, Michael C. Performance of metal-supported SOFCs with infiltrated electrodes, Journal of Power Sources, May 9, 2007, pp. 1-6.
Villarreal, I et al., Metal supported solid oxide fuel cells, Electrochemical and solid-state letters electrochem. Sep. 2003, pp. A178-A179, vol. 6, No. 9, USA.
Villarreal, Igor et al., Metallic Support SOFC Cell Development in Ikerlan, Stack and Cell Design, Jul. 3, 2008, pp. 1-5.
Visco, Steven et al., LBNL Activity Overview, SECA Workshop, Feb. 20, 2003, pp. 1-22.

\* cited by examiner

SUBSTRATE MADE OF POROUS METAL OR METAL ALLOY, PREPARATION METHOD THEREOF, AND HTE OR SOFC CELLS WITH A METAL SUPPORT COMPRISING THIS SUBSTRATE

TECHNICAL FIELD

The invention relates to a substrate made of porous metal or metal alloy.

The invention further relates to a method for preparing this substrate by pressing-sintering.

The invention finally relates to a high temperature electrolyzer cell (<<HTE>>) or a high temperature fuel cell (<<SOFC>> or <<Solid Oxide Fuel Cell>>), more specifically a high temperature electrolyzer cell or high temperature fuel cell with a metal support (<<MSC>> or <<Metal Supported Cell>> comprising said substrate.

The technical field of the invention may thus be generally defined as that of new energy technologies, more particularly as that of high temperature electrolyzers and high temperature fuel cells and, even more specifically, as that of cells of high temperature electrolyzers and of high temperature fuel cells with a metal support.

BACKGROUND

The first generation of high temperature electrolyzer cells or high temperature fuel cells, comprised a support formed by the electrolyte and was thus designated as an Electrolyte-Supported Cell (<<ESC>>). Such an electrolyte-supported cell is illustrated in FIG. 1: the oxygen $O_2$ electrode (1) and the hydrogen or water electrode (2) are positioned on either side of the thick electrolyte which forms the support (3).

The second generation of high temperature electrolyzer cells or high temperature fuel cells comprised a support formed by an electrode and was thus designated as an Anode-Supported Cell (<<ASC>>) in <<SOFC>> terminology or Cathode-Supported Cell (<<CSC>>) in <<HTE>> terminology. Such an electrode supported cell <<ASC>> or <<CSC>> is illustrated in FIG. 2: the electrolyte (3) and the oxygen electrode (1) are positioned on the thick hydrogen or water electrode (2) which is used as a support.

The third generation of high temperature electrolyzer cells or high temperature fuel cells, in which we are more particularly interested herein comprises a porous metal support and is therefore designated as a Metal-Supported Cell (<<MSC>>). Such a metal-supported cell may appear according to two configurations which are respectively illustrated in FIGS. 3A and 3B depending on whether the electrode which is placed in contact with the porous metal support is the hydrogen or water electrode (2) (FIG. 3A) or else the oxygen electrode (1) (FIG. 3B). More details on these various types of <<HTE>> and of <<SOFC>> may be found in document [1].

The metal-supported cells illustrated in FIGS. 3A and 3B include four layers (including one metal layer and three ceramic layers), i.e.:
- the porous metal support (4), generally with a thickness of less than 1 mm which ensures:
  - the mechanical support of the cell by its mechanical properties and its thickness,
  - the distribution of the gases as far as (up to) the electrode with view to electrochemical reactions by means of its porosity,
  - the collection of the current by its conducting metal nature.
- The $H_2/H_2O$ electrode (2) which is the anode for a SOFC and the cathode for a HTE. By means of the metal support (4), this electrode may be made thinner, with for example a thickness of less than 50 µm, its resistance to redox cycles is thus better and its cost is lower;
- the electrolyte (3), an ion conductor for $O^{2-}$ ions. The electrolyte (3) may be made thinner, with for example a thickness of less than 10 µm, its operating temperature may thus be lowered;
- the $O_2$ electrode (1) which is the cathode for a SOFC, and the anode for a HTE. This electrode (1) may be made thinner with for example a thickness of less than 50 µm.

In documents [2] and [3] different types of metal materials are mentioned for elaborating porous metal supports. First of all, these are metal alloys produced by standard, conventional, metallurgy, and then alloys produced by powder metallurgy, which are presented in these documents as being better candidates for producing the metal support [2-3].

On these supports are deposited ceramic layers (anode, electrolyte, cathode) by a vacuum plasma deposition method (VPS, or Vacuum Plasma Spraying), which does not require any sintering step at a high temperature [2-3].

The method for making the porous material is not described in these documents, and optimization of the microstructure and of the porosity with optionally a gradient of the latter, is not either mentioned.

Further, partial oxidation of the porous metal support is neither described nor suggested in documents [2] and [3].

In documents [5] to [8], a porous metal support is described. Two options are contemplated for subsequently depositing the ceramic layers on this support:
- either the ceramic layers are deposited on the <<green>> metal support, i.e. not sintered, and the assembly of the support and of the ceramic layers is then co-sintered at high temperature, but under a reducing atmosphere for avoiding significant oxidation of the metal support;
- or the ceramic layers are deposited on the already sintered metal support and are then sintered independently, which should be accomplished at a lower temperature, doubtless for avoiding oxidation of the metal and its densification.

The techniques for depositing ceramic layers are in majority conventional wet techniques such as strip casting or screen printing.

The porous metal support may, according to document [4], be produced by strip casting [4].

Document [8] reports a tubular porous metal support made by isostatic pressing, doubtless because the tubular geometry does not allow strip casting.

Documents [4] to [8] do not mention any optimization of the microstructure, or of the porosity with optionally a gradient regardless of the technique used. Documents [4] to [8] do not either mention any preliminary partial oxidation step (pre-oxidation) of the porous metal support before its use.

In documents [9], [10], and [11], a two-zone metal support is used which is dense on the sides for ensuring tightness and pierced in the middle for distributing the gases.

The holes in the central portion of the support are made by machining (photochemical [10] or laser [11]) machining). The holes formed have a diameter of 10 to 30 µm. Document [9] proposes a cell structure for this porous portion of the support.

Because of the technology used for producing the holes, the size of the holes is identical, without any gradient, over the whole thickness of the metal support and there is no optimization of the microstructure.

An oxidation of the metal support prior to its use (pre-oxidation) is neither mentioned nor suggested in these documents.

The ceramic layers as for them are deposited by wet techniques.

The range of operating temperatures aimed in documents [9], [10], and [11] is only from 500° C. to 600° C.

Document [12] relates to tubular metal supported cells. It is simply indicated that the supporting tube made of a porous metal material is produced by <<techniques with an industrial cost>>, but without further information.

Document [13] mentions metal-supported cells, the porous metal support of which consists of metal (<<Hastelloy>>) plates with a porosity of 27.5% [13]. It would seem that these are rather plates pierced with holes of the type of those described in documents [9], [10], and [11].

Document [14] relates to tubular metal supported cells, wherein the metal support is porous with porosity between 20 and 75%. This metal support is prepared by a wet process and there is no mention of optimizing its porosity and even less of a gradient of the latter, or of any oxidation of the metal support before its use (pre-oxidation).

In document [15], a concept called <<bipolar plate-supported SOFC>> is discussed. A metal plate, which acts as an interconnector (or bipolar plate) between two adjacent cells of a stack, is also used as a support for ceramic cells. Between this dense plate and the ceramic cells, porous metal materials are inserted. They are deposited by wet techniques just as for the ceramic layers and are co-sintered with the latter [15]. There is no mention is this document [15] of any optimization of the porosity of the metal porous materials, and even less of any gradient of the latter, or of any oxidation of these metal porous materials prior to their use.

Document [1] already cited, mentions cells with a metal support made of a FeCr alloy, but no detail on this type of support and especially its porosity, as well as on its forming, shaping, is provided.

Document [16] relates to a metal-supported cell, the metal support of which is a metal plate having cavities and channels for distributing the gases as far as (up to), the electrode, these channels being made by chemical etching. So really, one cannot speak of porosity in this document and even less of an optimization or of a gradient of the latter. Further, no oxidation of the metal support prior to its use (pre-oxidation) is mentioned in this document.

Moreover it will be noted that in all the documents cited above, the <<HTE>> application is seldom or even never mentioned.

However, document [17] describes a method for preparing a reversible SOFC, i.e. which may operate in an SOFC mode or in a HTE mode. In this document, the use of a porous metal support especially made of ferritic stainless steel is mentioned. The porosity of the metal support is achieved by adding pre-forming agents during the manufacturing of the support and the porosity may be finely adjusted by acting on the amount of added pre-forming agents. However, there is no mention in this document of pore size or of porosity gradient. Further, in the examples of this document, it is specified that the porous support is produced by strip casting.

Finally, an oxidation of the porous support prior to its use (pre-oxidation) is neither mentioned nor suggested in this document.

The document of Molins et al. [18] presents a porous metal material, produced by pressing-sintering under hydrogen starting with the stainless steel commercial grade 430L and evaluates its resistance to oxidation. A porosity of 40% is indicated, and the conclusion is drawn that the resistance to oxidation of this porous material is not satisfactory for an SOFC application. This document does not mention the deposition of ceramic layers on this porous material, nor the optimization of microstructure and in particular of its porosity, nor the oxidation of the porous material prior to its use, i.e. the pre-oxidation of the porous material.

In none of documents cited above, is mentioned the question of optimizing the porous metal support for promoting adherence, anchoring of the ceramic layers, while this is a crucial problem for proper operation of an SOFC-HTE cell.

Therefore there exists a need for a porous metal support for a high temperature electrolyzer cell (<<HTE>>) or a high temperature fuel cell (<<SOFC>> or <<Solid Oxide Fuel Cell>>) which allows excellent adherence, anchoring of the ceramic layers and further excellent resistance to oxidation by the gases during use.

More generally there exists a need for such a porous metal support which has properties meeting the following criteria and requirements:

Physical and Physico-Chemical Properties:

1°) the support should play the role of a mechanical support for the cell: it should therefore have some cohesion and sufficient thickness, as well as sufficient mechanical properties;

2°) the support should ensure delivery and distribution of the gases as far as the electrode: it should therefore have a porosity adapted to the contemplated gases and flow rates;

3°) the support should ensure collection of the current:
  it should therefore be an electron conductor, which is possible because of its metal nature,
  it should remain an electron conductor over time, during operation for a long time of the cell at a high temperature, i.e. it should especially resist oxidation in the relevant atmospheres, i.e. $H_2/H_2O$ or $O_2$/air depending on the selected configuration;

4°) the support should allow deposition of the first electrode, which is a ceramic material (oxide), or a metal/oxide cermet (typically Ni-YSZ), it should therefore:
  have a surface which allows both good physical and chemical adherence, anchoring of this ceramic or cermet layer;
  be able to withstand the sintering step of the ceramic layers of the electrodes and of the electrolyte which may be required according to the selected methods for depositing ceramic layers. In order to be able to withstand this sintering step, the support should:
    retain its porosity during this treatment,
    not be significantly oxidized.
  have a coefficient of thermal expansion compatible with that of the deposited layers of ceramics or cermet;
  not chemically react with the deposited electrode material (oxide or cermet).

Economic Properties:

5°) the support should be inexpensive, one of the goals being to reduce the cost of metal-supported cells as compared with other types of cells;

6°) the support should be able to be formed, shaped, with simple, fast, robust and not very expensive techniques;

7°) the support should be able to be formed, shaped, with various sizes and shapes which may be required for the application (circular, square shapes, small sizes, large sizes . . . ).

The goal of the present invention is to provide a porous metal support for a high temperature electrolyte cell (<<HTE>>) or high temperature fuel cell (SOFC or Solid Oxide Fuel Cell) which i.a. meets the needs mentioned above, which has the properties mentioned above, and which meets the criteria and requirements listed in the foregoing.

The goal of the present invention is further to provide such a porous metal support which does not have the drawbacks, defects, limitations and disadvantages of the metal porous substrates of the prior art, especially illustrated by the documents mentioned above, and which overcomes the problems of the porous metal supports of the prior art.

DESCRIPTION OF CERTAIN INVENTIVE ASPECTS

This goal and further other ones are achieved, according to the invention, by a partly (partially) oxidized substrate, obtained by subjecting a substrate made of a porous metal or metal alloy comprising particles of at least one metal or metal alloy bound by sintering, said substrate comprising a first main surface and a second main surface, and said substrate having a porosity gradient from the first main surface to as far as (up to) the second main surface; to partial oxidation by an oxidizing gas such as oxygen and/or air.

Advantageously, said partial oxidation may be carried out at a high temperature and for a short duration, time.

Advantageously, the first main surface and the second main surface may be planar and parallel surfaces. And therefore the substrate is then a planar substrate.

Advantageously, the first main surface may be an upper surface and the second main surface may a lower surface.

Advantageously, the porosity may decrease from the second main surface to as far as (up to) the first main surface, and the substrate may then comprise from the second main surface to the first main surface at least one high porosity layer in contact with the second main surface and a low porosity layer in contact with the first main surface.

The high porosity layer has a porosity generally from 25% to 65%, advantageously from 30% to 60%, and the low porosity layer has a porosity generally from 10% to 40%, advantageously from 10% to 30%, it being understood that the low porosity layer has a porosity below that of the high porosity layer.

The high porosity layer generally comprises large pores with a size, for example a diameter, for example from more than 20 μm to 50 μm, and the low porosity layer generally comprises small pores with a size, for example a diameter, for example from 1 μm to 20 μm.

The high porosity layer may advantageously have a thickness from 100 μm to 5 mm and the low porosity layer may advantageously have a thickness from 20 to 500 μm, preferably from 50 to 100 μm.

Advantageously, the metal or the alloy is selected from iron, iron-based alloys, chromium, chromium-based alloys, iron-chromium allows, stainless steels, nickel, nickel-based alloys, nickel-chromium alloys, alloys containing cobalt, alloys containing manganese, aluminium and alloys containing aluminium.

The low porosity layer may be made of a first metal or metal alloy and the high porosity layer may be made of a second metal or metal alloy or else the high porosity layer and the low porosity layer may be made of a same metal or metal alloy.

Advantageously, the first metal or alloy may be selected from chromium, chromium-based alloys, iron-chromium alloys, stainless steels, nickel, nickel-based alloys, nickel-chromium alloys.

Advantageously, the second metal or alloy may be selected from chromium, chromium-based alloys, iron-chromium alloys, stainless steels, nickel, nickel-based alloys, nickel-chromium alloys.

Advantageously, the first main surface of the substrate is an upper surface and the first metal or alloy constituting the low porosity layer may be selected in order to limit oxidation at the surface and/or reactivity with an electrode material such as an oxide or a cermet and/or for accommodating expansions.

Advantageously, one or more (several) intermediate layer(s) may be provided between the high porosity layer and the low porosity layer, the intermediate layer(s) having porosity such that the porosity of the substrate decreases from the high porosity layer to as far as the low porosity layer.

The partly, partially, oxidized substrate according to the invention is obtained by subjecting a porous metal or metal alloy substrate as described above, which may be described as a <<non-oxidized>> substrate, to partial oxidation by an oxidizing gas such as air and/or oxygen.

This oxidation is a controlled partial oxidation i.e. it is carried out under conditions, for example under temperature and pressure conditions, such that they lead to a partly, partially oxidized substrate as defined in the present invention and not totally oxidized.

This controlled partial oxidation is preferably carried out at a high temperature, especially at a temperature from 600° C. to 1,600° C., preferably from 800 or 900° C. to 1,200° C., and for a short time.

By <<short time>>, is generally meant a duration from 1 to 20 minutes, preferably from 1 to 10 minutes.

By <<partly oxidized substrate>> in the sense of the invention, is meant that substantially all the particles of the substrate, preferably all the particles of the substrate, are oxidized and that each of these particles is partly oxidized, generally on a surface layer, and not totally oxidized.

In other words, the term of <<partly>> (partially) rather relates to the oxidation of each particle, grain, and not of the substrate taken as a whole (only a geometrically limited portion of which would be oxidized), since substantially the whole of (all) the particles and preferably all the particles, are each partly oxidized. These particles are found in the whole volume, throughout the volume of the substrate.

The porous metal substrate or support, partly oxidized, according to the invention, has never been described in the prior art as especially illustrated by the documents cited above. In particular, the porosity gradient exhibited by the support or substrate according to the invention, combined with a partial oxidation are neither mentioned nor suggested in the prior art.

The substrate according to the invention may be described as a <<pre-oxidized substrate>> in the sense that it is subject to oxidation prior to its use, its application. This pre-oxidation which is part of the method for manufacturing the substrate, should not be confused with the oxidation to which the substrate is subject during its use.

The partly oxidized porous metal substrate or support according to the invention i.a. meets the whole of the needs mentioned above.

The partly oxidized porous substrate or support according to the invention has properties which meet the criteria and requirements indicated above, the porous substrate or support according to the invention provides a solution to the problems posed by substrates of the prior art and does not have any of their drawbacks.

In particular, the partly oxidized porous support or substrate according to the invention may easily be made by pressing-sintering which is a fast, and inexpensive technique.

The particular microstructure of the substrate or support according to the invention with especially a porosity gradient allows observance of the specifications defined above for such a support and in particular promotes distribution of the gases as well as the adherence, anchoring of the ceramic layers.

Further, the various layers which may form, constitute the support or substrate may be made of different metals or alloys and the metal or alloy of the upper layer may be selected so as to limit surface oxidation and/or reactivity with an electrode material such as an oxide or cermet and/or to adapt the coefficients of thermal expansion (CTE) of the materials facing each other.

The invention further relates to a method for preparing the substrate as described above, wherein the following successive steps are carried out:

- at least two layers of metal powders having decreasing, respectively increasing grain sizes are successively deposited in a vertical mold with a size and shape adapted to the size and shape of the substrate;
- said layers are pressed so as to obtain a green porous substrate;
- the green porous substrate is separated from the mold;
- the green porous substrate is sintered;
- at the end of the sintering, partial oxidation of the substrate is performed by putting the substrate in contact with an oxidizing gas such as air and/or oxygen.

Advantageously, partial oxidation may be carried out at a high temperature and for a short time.

Advantageously, a lower layer consisting of a powder with a large grain size is first deposited, followed by an upper layer consisting of a powder of small grain size or vice versa.

Generally, the powder with a large grain size has a grain size of more than 50 µm to 500 µm, and the powder of small grain size has a grain size from 1 µm to 50 µm.

Advantageously, one or more (several) intermediate layer(s) consisting of powders having an intermediate grain size between the grain size of the powder constituting the lower layer, respectively the upper layer of large grain size, and the grain size of the powder constituting the upper layer, respectively the lower layer of small grain size, may be deposited between the lower layer and the upper layer, the grain size of these layers being such that it decreases from the intermediate layer which is the closest to the layer consisting of a powder of large grain size to as far as the intermediate layer which is the closest to the layer consisting of a powder with small grain size.

These intermediate layers may be from 1 to 8 in number, preferably their number is less than or equal to 5.

All the powder layers (including the optional intermediate layers) may be constituted, consist of a same alloy or metal or else one or more powder layers may consist of a metal or alloy different from that of the other layers.

The metal or alloy of the layer with a small grain size which preferably is the upper layer may be selected so as to limit surface oxidation and/or reactivity with an electrode material such as an oxide or a cermet; it may also be appropriate to adapt the coefficient of thermal expansion (CTE), in other words the expansions of these 2 materials, i.e. the metal or alloy of the layer with small grain size on the one hand and the electrode material on the other hand.

Advantageously, pressing may be performed, carried out by uniaxial compression.

Advantageously, pressing may be performed, carried out with a pressure from 10 to 700 MPa, preferably 100 MPa.

Advantageously, the sintering is carried out under a controlled atmosphere, with an oxygen partial pressure of less than $10^{-20}$ atm.

Advantageously, sintering is carried out at a temperature comprised between the minimum temperature for beginning, starting, the sintering and the total densification temperature of the substrate, preferably at a temperature corresponding to 85% of the total densification temperature of the substrate.

Advantageously, this temperature is from 600° C. to 1,600° C., preferably from 800° C. to 1,400° C.; for example 1,200° C.

Advantageously, the sintering temperature may be maintained (temperature plateau) for a duration from one to a few minutes, for example from 2 to 10 minutes, up to one or several hours, for example from 2 to 10 hours, for example the duration of the plateau may be 3 hours.

However, sintering with a plateau is not mandatory.

At the end of sintering, partial controlled oxidation of the substrate is achieved by putting the substrate in contact with an oxidizing gas such as air and/or oxygen.

This putting into contact is advantageously performed at a high temperature, for example equal to or less than the temperature at which sintering is achieved, for example at a temperature of 600° C. to 1,600° C.; and for a short time, for example from 1 to 20 minutes, preferably less than 10 minutes.

The method according to the invention which applies a pressing-sintering technique for preparing a substrate, with a porosity gradient, has never been described nor suggested in the prior art where the mentioned techniques for preparing porous metal substrates are essentially either strip casting, or machining of holes, and where the preparation of a substrate with a porosity gradient is neither mentioned, nor brought up to mind.

Further, the last step of the method according to the invention during which partial oxidation of the sintered substrate is achieved is not either mentioned or suggested.

As this was already specified above, the pressing-sintering technique has many advantages in terms of rapidity, reliability, robustness and cost.

The invention further relates to a high temperature electrolyzer cell or a high temperature fuel cell comprising a porous metal substrate or support as described above.

More specifically, this high temperature electrolyzer cell or high temperature fuel cell comprises a porous metal substrate or support as described above, on which a water or hydrogen electrode, an electrolyte, and an oxygen electrode are successively stacked.

Or else this high temperature electrolyzer cell or high temperature fuel cell comprises a porous metal substrate or support as described above, on which an oxygen electrode, an electrolyte and a hydrogen or water electrode are successively stacked.

Other effects and advantages of the invention will become better apparent upon reading the detailed description which follows, made with reference to the appended drawings wherein:

Figure 1:
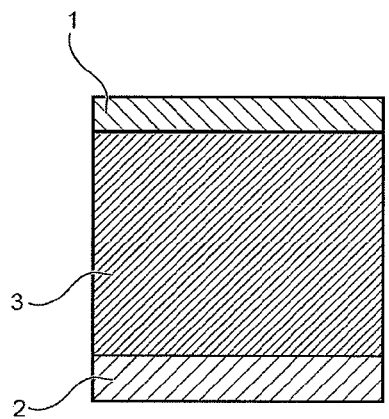
FIG. 1 is a schematic vertical sectional view of a <<HTE>> or <<SOFC>> cell with an electrolyte support (<<ESC>>)
Figure 2:
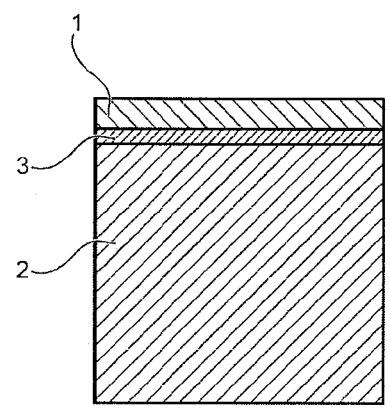
FIG. 2 is a schematic vertical sectional view of an <<HTE>> or <<SOFC>> cell with an electrode support (anode support: <<ASC>> in the <<SOFC>> denomination or cathode support: <<CSC>> in the <<HTE>> denomination)

The mass increase Dm/m (%) is plotted in ordinates and the duration of the oxidation (in hours) is plotted in abscissae.

DETAILED DISCUSSION OF CERTAIN ILLUSTRATIVE EMBODIMENTS

The detailed description which follows is rather made for convenience, with reference to the method according to the invention.

First of all, let us specify that the term porous as used herein in connection with a material such as a metal or metal alloy, means that this material contains pores or voids.

Accordingly, the specific gravity of this porous material is less than the theoretical specific gravity of the non-porous material.

The pores may be connected or isolated but in the porous metal substrate according to the invention, the majority of the pores are connected and in communication. One then refers to open porosity.

In the sense of the invention, a support is generally considered as porous when its specific gravity is at most of about 95% of its specific gravity.

Further, the terms of substrate and support are equally used herein, the term of support rather relating to the integrated porous substrate or which will be integrated in a HTE or SOFC.

In the first step of the method according to the invention, at least two successive layers of metal powders having decreasing, respectively increasing grain sizes are introduced into a mold having the shape of the substrate.

The method according to the invention allows the preparation of substrates of any sizes and of any shapes, even complex. Thus, the substrate may have a main section as a polygon, for example a square or rectangular section or else a circular section.

The substrate is generally a flat, planar substrate i.e. the first and second surfaces mentioned above are generally flat, preferably horizontal and parallel, and for example have one of the shapes mentioned above: polygon, rectangle, square or circle, and further the thickness of the substrate is small relatively to the dimensions of said first and second surfaces.

It is important to note that the pressing-sintering technique applied according to the invention has not been applied to the preparation of planar substrates in the prior art.

The substrate may especially have the shape of a disc, for example with a thickness from 100 µm to 5 mm and a diameter from 20 mm to 500 mm or the shape of a rectangular parallelepiped or further the shape of a substrate with a square section.

The substrate may be a substrate of large size, i.e. for example a diameter or a side from 50 mm to 300 mm, or a small size substrate for example 10 mm to 50 mm.

The mold has a shape and size adapted to the shape and size of the substrate, the preparation of which is desired.

The mold is generally in a metal material.

The metal powders introduced into the mold may be selected from the following metal and metal alloy powders: iron, iron-based alloys, chromium, chromium-based alloys, iron-chromium alloys, stainless steels, nickel, nickel-based alloys, nickel-chromium alloys, alloys containing cobalt, alloys containing manganese, alloys containing aluminium.

The powders used in the method according to the invention may be commercial powders or else they may be prepared by milling or atomizing solid pieces of metals or alloys.

The metal or alloy powders used in the method according to the invention generally have a grain size from 1 µm to 500 µm, preferably from 1 µm to 100 µm.

In order to obtain the porosity gradient of the porous metal support according to the invention, at least two powder layers, which have increasing, respectively decreasing grain sizes, are successively deposited in the mold.

Indeed, the larger the grain size of the powder, the higher is the porosity of the pressed and then sintered material stemming from this powder.

Thus, it is possible to start with depositing into the mold a first or low layer consisting of a powder of large grain size, i.e. for example from 50 µm to 500 µm, intended to form in the final porous metal support, and after compression/pressing and then sintering, a lower layer of large porosity, i.e. with a porosity generally from 25% to 65%, advantageously from 30% to 60%. In the final porous metal support, this lower layer of large porosity gives the possibility of facilitating delivery of the gases through the porous material.

The thickness of this lower layer consisting of a powder with a large grain size is such that it provides in the final porous material a layer of large porosity with a thickness generally from 100 µm to 5 mm.

Above this lower layer consisting of a powder of large grain size, a layer formed by a powder of small grain size is deposited, i.e. for example from 1 μm to 50 μm, intended to form in the final porous metal support, and after compression and sintering, an upper layer of low porosity, i.e. a porosity generally from 10% to 40%, advantageously from 10% to 30%. In the final porous metal support, this upper low porosity layer gives the possibility of facilitating adherence, anchoring of the ceramic layers constituting the electrodes.

The thickness of this upper layer consisting of a powder with small grain size is such that it provides in the final porous material a layer of low porosity with a thickness generally less than 500 μm, and preferably less than 100 μm.

Instead of first depositing a lower layer consisting of a powder of large grain size and then an upper layer consisting of a powder of small grain size, it is of course conversely possible to begin by depositing the layer consisting of a powder of small grain size and then depositing the layer consisting of a powder of large grain size.

One or more intermediate layer(s) consisting of powders having an intermediate grain size between the grain size of the powder forming, constituting, the lower layer, respectively upper layer of large grain size, and the grain size of the powder forming, constituting, the upper layer, respectively lower layer of small grain size, may be deposited between the lower layer and the upper layer.

These intermediate layers may be from 1 to 8 in number, for example from 1 to 5, notably 2, 3 or 4. The grain size of the powders which make up these intermediate layers is advantageously selected so as to ensure a more continuous change in the porosity in the final porous metal support. In other words, these intermediate layers are formed by powders, the grain size of which decreases from the layer closest to the layer consisting of a powder of large grain size to as far as the layer which is the closest to the layer consisting of a powder of small grain size.

Thus, 4 intermediate layers consisting of powders respectively having a grain size from 300 to 400, 200 to 300, 100 to 200, 50 to 100 μm may be provided between a layer of large grain size generally having a grain size from 400 to 500 μm and a layer of small grain size generally having a grain size from 1 to 50 μm.

The porosity and the exact thickness of the layers in the final porous metal support are defined by the grain size of the powders as well as by the force applied during the pressing step described below.

Further, all the layers of powders including the optional intermediate layers may consist of a same alloy or metal or else one or more layers of powders may consist of a metal or alloy different from that of the other layers.

For example, the layer consisting of a powder of small grain size which will provide in the final porous support the low porosity layer, which is generally the upper or surface layer, may be made of a metal different from that of the other layer(s) and especially of the lower layer consisting of a powder of large grain size.

The metal or alloy of the upper layer may thus be selected so as to be different from the metals or alloys of the other layers for one or more of the following reasons:
  in order to exhibit better resistance to oxidation, in order to avoid developing a too thick oxide layer which will be detrimental to the operation of the cell. Indeed, a problem is then posed of collecting the current in the presence of an oxide layer, further, poisoning of the electrode in the case of the air electrode configuration on a metal support may occur. All the metals and alloys mentioned earlier, i.e. chromium, chromium-based alloys, iron-chromium alloys, stainless steel, nickel, nickel-based alloys, nickel-chromium alloys meet these conditions;
  in order to minimize the chemical reactivity with the electrode material such as an oxide or a cermet, which would also be a penalty for operating the cell. All the metals and alloys mentioned earlier fulfill this role.
  in order to play the role of an accommodation, adaptation, layer in terms of coefficient of thermal expansion between the lower sub-layer of the porous support and the ceramic layers. The Fe/Cr alloys and stainless steel fulfill this role.

Once the layers of powders have been positioned in the mold, it is then proceeded with a step for forming, shaping, these powders by pressing, compression. Before pressing, it is optionally possible to incorporate a binder, such as an organic binder of the PVA type, for example by using a slurry having a binder content from 1 to 20%, preferably 5% by weight. By incorporating this binder, it is possible to obtain sufficient mechanical strength of the green pressed parts.

The different layers are deposited by quite simply pouring them into the mold, and the pressing and sintering are generally achieved in one go, over the whole of the layers. It is also possible to achieve pressing and sintering, layer by layer.

Preferably, this pressing, this compression is achieved by means of a uniaxial press.

During the pressing, a pressure comprised between 10 and 700 MPa, preferably 100 MPa, is generally applied in order to thereby obtain a porosity from 70% to 20%, and preferably from 40% to 60% in the green state.

At the end of the forming, shaping step by pressing, compression, a <<crude>>, <<green>> porous metal support is obtained with an average global porosity from 70% to 20%, preferably from 40% to 60%. The <<green>> porous metal support, substrate, is then separated from the mold.

The next step of the method according to the invention consists of sintering this <<green>>, <<crude>> metal support.

The sintering of this <<green>> porous metal support is preferentially carried out under a controlled atmosphere, i.e. an atmosphere generally defined by a very low oxygen partial pressure, for example of less than $10^{-20}$ atm, in order to limit oxidation of this porous material. This atmosphere generally consists of argon or nitrogen in the presence of a reducing agent such as hydrogen, or else of pure hydrogen.

The sintering is generally carried out at a temperature comprised between the minimum starting temperature of sintering and the total densification temperature of the material making up, constituting the <<green>> porous support. This temperature is generally from 600° C. to 1,600° C. and more specifically, it is from 800° C. to 1,400° C., especially for 1.4509 steel.

Preferably, the sintering temperature corresponds to 85% of the total densification temperature of the material, i.e. for example 1,200° C.

The sintering temperature may be maintained (sintering plateau) for a duration from 0 to 8 hours, for example 3 hours.

The selection of the densification-sintering temperature as well as the duration of the sintering plateau will be conditioned by the desired global, average, final porosity of the material and preferably a sintering temperature of 1,200° C. will be selected, which will be maintained for a duration of 3 hours.

It is seen that it is preferred to press and sinter all the layers in one go but when each layer consists of a different material and/or with a different gain size, each of these layers also has different temperatures and/or sintering durations and/or sintering plateaus. The man skilled in the art can then easily determine the temperatures, durations and sintering plateaus for the whole of the layers by means of a few preliminary tests.

At the end of the sintering, a partial controlled oxidation of the porous substrate is carried out by putting it into contact with an oxidizing gas such as air and/or oxygen. This partial oxidation may consist of purging the gases which made up, constituted, the atmosphere used during the sintering and then of putting the substrate back into an oxidizing atmosphere, for example of air and/or oxygen at ambient pressure at a high temperature, preferably the same temperature as the one used for sintering, for example 1,200° C., or at a temperature below the sintering temperature (for example 800° C. or 900° C.) for only a few minutes, for example for 1 to 20 minutes, preferably for 1 to 10 minutes.

More specifically, if the substrate is initially at a temperature below that of the preliminary partial oxidation or preoxidation treatment (for example at room temperature), it is possible to, first of all, perform a rise in temperature from this temperature up to the pre-oxidation treatment temperature, generally in a neutral or slightly reducing atmosphere, for example an argon atmosphere or an argon atmosphere added with hydrogen, for example 2% hydrogen. This rise in temperature may be accomplished for example at a rate of 300° C./hour. Once the pre-oxidation temperature has been reached which is generally from 600° C. to 1,200° C., for example 900° C., sweeping the oven with a neutral gas, for example sweeping with nitrogen for a period of time from 1 to 20 minutes, preferably from 1 to 10 minutes, for example 10 minutes, is performed, and the gas for pre-oxidation such as air and/or oxygen is introduced, fed.

Pre-oxidation as mentioned above is generally carried out at a temperature from 600° C. to 1,600° C., preferably from 800 to 1,200° C., for example 900° C., for a time from 1 to 20 minutes, preferably from 1 to 10 minutes. The substrate is then brought back to room temperature, by cooling it down for example in an atmosphere of neutral gas such as nitrogen for example at a rate of 300° C./hour.

The pre-oxidation is a controlled partial oxidation, i.e. it is generally controlled in terms of duration and therefore of oxide thickness which will ensure the protective function against subsequent oxidation (especially during the operation of the cell) which would be faster without this protective layer. This partial oxidation leads to the formation of a layer which may be described as a <<pre-oxidation>> layer on the grains of the porous substrate and especially on the grains of small size and small grain size, which generally make up, constitute, the upper less porous layer of the porous metal substrate according to the invention (see FIGS. 6 and 7).

By <<partial oxidation>>, is meant that all the grains of the whole thickness of the porous material are oxidized (and this is what is sought) possibly except for the grains which are found in areas where the oxidizing gas will not be able to access, but that each of the grains is not totally oxidized, and is only partly oxidized, and generally over a certain thickness. This oxidized thickness is difficult to measure since it is generally very thin and generally much less than one μm.

In other words, by <<partial oxidation>>, is meant that one has controlled oxidation of each grain of the porous substrate, but that the whole of the porous substrate is however affected by this oxidation and that the oxidation does not concern only a limited portion of the porous substrate. In other words, all the grains, particles of the porous substrate are oxidized but each is oxidized in a controlled partial way.

The oxidation is controlled in the sense that the conditions of this oxidation and especially its duration and the temperature at which it is carried out are selected so that each of the grains, particles, is partly oxidized generally over a limited defined thickness, but not totally.

Figure 12:
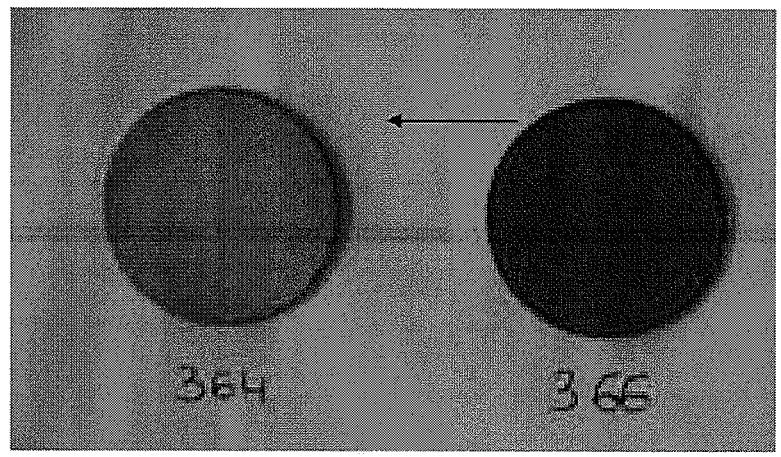
FIG. 12 shows photographs which show a non-preoxidized porous metal support (on the left) and a preoxidized porous metal support at 900° C. for 10 minutes in air (on the right)
Figure 13:
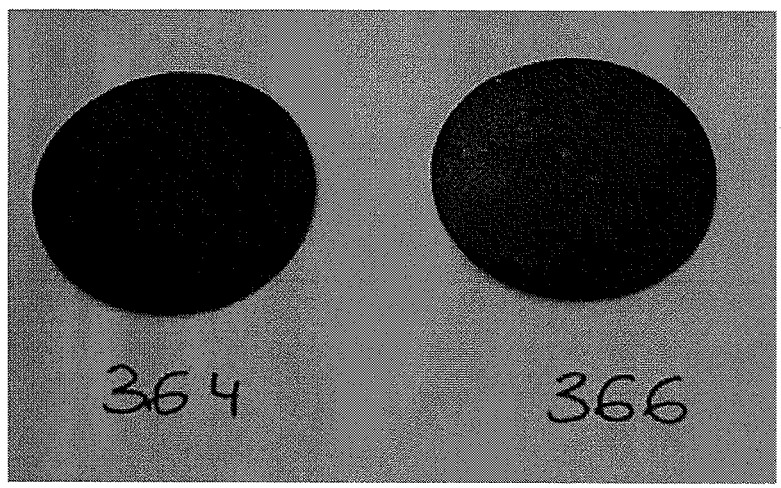
FIG. 13 shows photographs which show a sample of a non-preoxidized porous metal support having subsequently undergone an oxidation at 800° C. in air for 70 hours (on the left) and a sample of a preoxidized porous metal support having subsequently undergone an oxidation at 800° C. in air for 70 hours (on the right)
Figure 14:
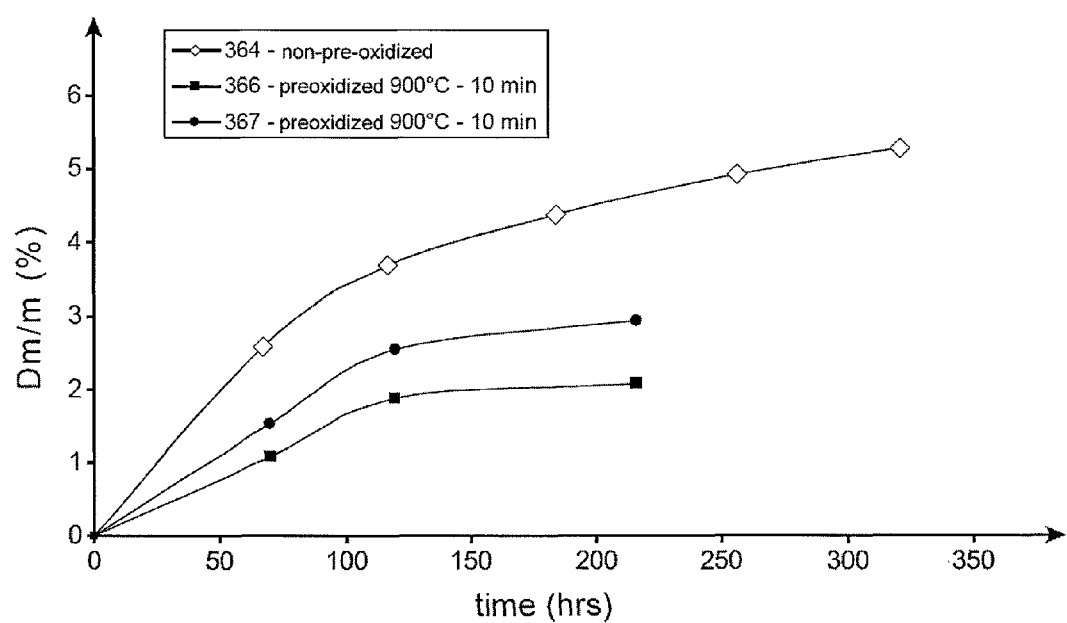
FIG. 14 is a graph which shows the mass increase for samples of preoxidized porous metal supports (sample 366, points ■; and sample 367, points ●) during oxidation in air at 900° C. for 10 minutes; and for a comparative non-preoxidized sample (sample 364, points ◆).

By this controlled partial oxidation, better resistance to oxidation by gases during use and better adherence, anchoring of the low porosity layer are obtained on the ceramic materials forming, constituting, the anode/electrolyte/cathode layout (see Example 7 and FIGS. 12 to 14).

At the end of the sintering and partial oxidation, lowering of the temperature is carried out as described above from the partial oxidation temperature down to room temperature and the porous substrate or support is recovered.

The thereby produced porous substrates or supports have a global average porosity generally comprised between 10% and 70%, preferably from 20% to 40%.

The produced porous supports or substrates will for example have a thickness from 200 μm to 5 mm between two parallel planar surfaces, for example from 4 $cm^2$ to 900 $cm^2$.

Figure 3A:
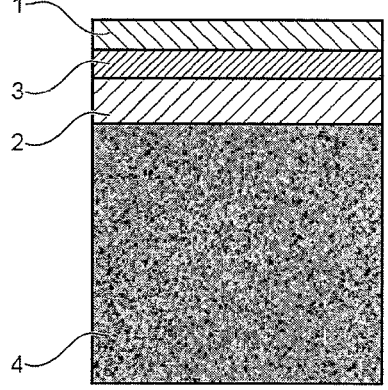
FIG. 3A is a schematic vertical sectional view of an <<HTE>> or <<SOFC>> cell with a metal support (<<MSC>>) in a first configuration wherein the electrode which is placed in contact with the porous metal support, is the hydrogen or water electrode.
Figure 3B:
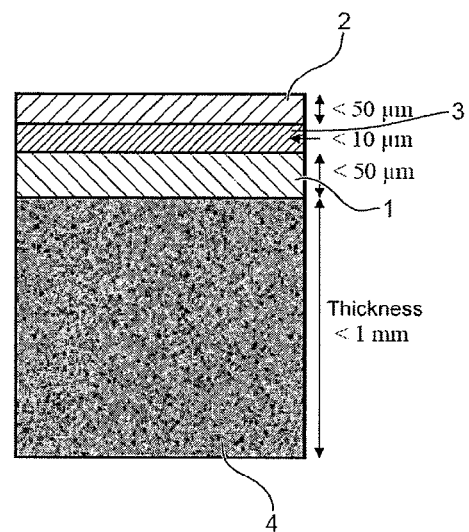
FIG. 3B is a schematic vertical sectional view of a <<HTE>> or <<SOFC>> cell with a metal support (<<MSC>>) in a second configuration wherein the electrode which is placed in contact with the porous metal support, is the oxygen electrode.

These porous metal supports are then used for making metal-supported cells such as the ones illustrated in FIG. 3A or in FIG. 3B.

The material of the hydrogen or water electrode is selected from materials known to the man skilled in the art for this type of electrode, this may be for example a cermet, NiYSZ, or a ceramic of the oxide type.

The material of the oxygen electrode is selected from materials known to the man skilled in the art for this type of electrode, this may be for example simple or multiple perovskite.

The material of the electrolyte is selected from materials known to the man skilled in the art for this type of electrode, this may for example be yttriated zirconia.

Figure 4:
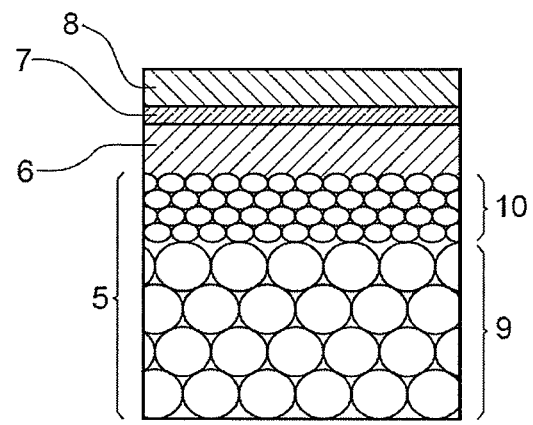
FIG. 4 is a schematic vertical sectional view of a <<HTE>> or <<SOFC>> cell comprising a bilayer porous metal support, with a porosity gradient according to the invention, with a very porous lower layer and a less porous upper layer.
Figure 5:
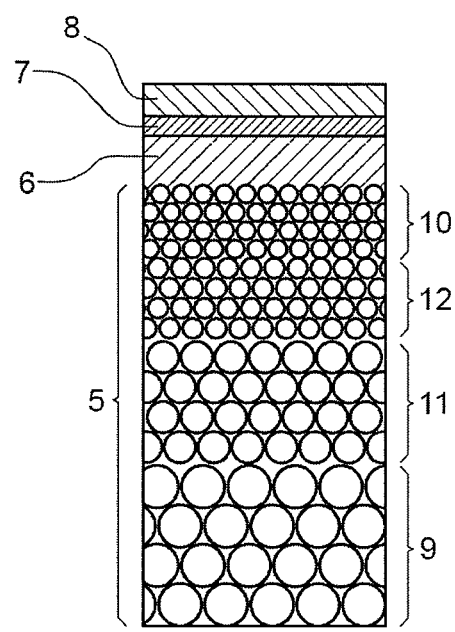
FIG. 5 is a schematic vertical sectional view of a <<HTE>> or <<SOFC>> cell comprising a porous metal support with a porosity gradient according to the invention, with a very porous lower layer and a less porous upper layer between which intermediate porosity layers are inserted.

In FIGS. 4 and 5, a high temperature electrolyzer <<EHT>> or an <<SOFC>> fuel cell are schematically illustrated, comprising a bi-layer porous metal support (5) with a porosity gradient according to the invention, on which are deposited as in FIGS. 3A and 3B, a first electrode (6) (hydrogen or water or else oxygen electrode), an electrolyte (7) and a second electrode (8) (oxygen, or else hydrogen or water electrode according to the nature of the first electrode).

The metal support comprises a highly porous lower layer (9), for example with a porosity from between 25% to 65%, advantageously from 30% to 60%, and with large pores for example with a diameter of more than 20 μm to 50 μm, and a less porous upper layer (10), for example with a porosity from 10% to 40%, advantageously from 10 to 30%, and with small pores with a diameter from 1 μm to 20 μm for example.

It should also be noted generally that the lower layer of high porosity (9), which is highly porous, is formed, constituted, by sintered particles with a large grain size i.e. from 50 μm to 500 μm, while the less porous upper layer (10) of low porosity consists of sintered particles with small grain size i.e. from 1 to 50 μm. The grain size of the particles, the porosity, and the size of the pores are generally related and vary in the same direction.

The less porous upper layer (10) may be made of a material such as chromium, chromium-based alloys, iron-chromium alloys, stainless steels, nickel, nickel-based alloys, nickel-chromium alloys, either identical with or different from the material of the lower layer for example made of a material such as chromium, chromium-based alloys, iron-chromium alloys, stainless steels, nickel, nickel-based alloys, nickel-chromium alloys.

As this has already been specified above, the material of the upper layer may be selected for limiting surface oxidation and/or chemical reactivity with the electrode material, and/or for accommodating, adapting, the coefficients of thermal expansion (CTE) of the 2 materials facing each other.

The small pores of the upper layer and its smoother upper surface promote adherence, anchoring of the layers. The large pores of the highly porous lower layer promote delivery of the gases.

In FIG. 5, a high temperature electrolyzer <<HTE>> or a <<SOFC>> fuel cell is schematically illustrated, comprising a porous metal support with a porosity gradient according to the invention, on which are deposited as in FIGS. 3A and 3B, a first electrode (6) (hydrogen or water or else oxygen electrode), an electrolyte (7) and a second electrode (8) (oxygen, or else hydrogen or water electrode depending on the nature of the first electrode).

The metal support (5) as well as the support of FIG. 4 comprises a highly porous lower layer (9), for example with a porosity from 25% to 65%, advantageously from 30% to 60%, and with large pores for example with a diameter of more than 20 μm to 50 μm, and a less porous upper layer (10), for example with a porosity from 10% to 40%, advantageously from 10% to 30%, and with small pores with a diameter from 1 μm to 20 μm for example. Between the upper (10) and lower (9) layers, are inserted several intermediate layers (11, 12) having porosities which decrease from the bottom to the top. In FIG. 5, 2 intermediate layers (11, 12) have been illustrated but it is quite obvious that a single intermediate layer or else up to 8 intermediate layers may be provided.

The intermediate layers (11, 12) give the possibility of having a more continuous change in porosity, promoting especially gas circulation in a more homogeneous way.

For example in FIG. 5, the 2 intermediate layers (11, 12) may respectively have a porosity from 40% to 30% and from 30% to 20% and a pore diameter from 35 μm to 50 μm and from 20 μm to 35 μm.

Like for the support of FIG. 4, the less porous upper layer (10) may be made of a material such as a Fe/Cr alloy either identical with or different from the material of the more porous lower layer (9) for example made of a Ni-based alloy and identical with or different from the material of the intermediate layers (11, 12) with intermediate porosities.

Figure 6:
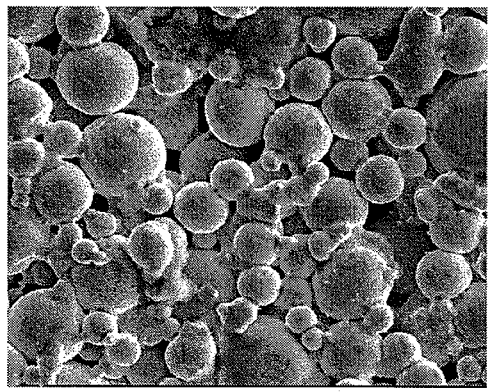
FIG. 6 is a view with an electron microscope of a porous metal support according to the invention.
Figure 7:
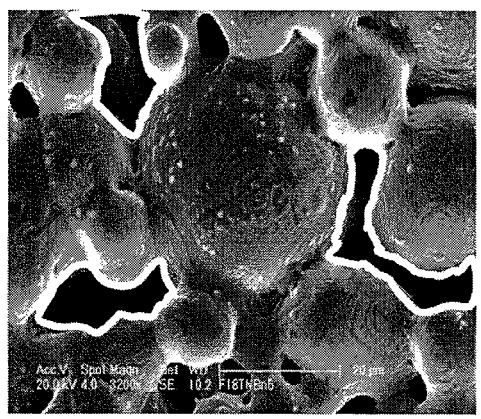
FIG. 7 is an enlargement of the photograph of FIG. 6. The scale illustrated in FIG. 7 is 20 µm.

In FIGS. 6 and 7, the porous metal support of the <<HTE>> or of the <<SOFC>> is a pre-oxidized porous metal support which has been subjected to a partial oxidation by an oxidizing gas. In FIG. 7 which is an enlargement of the photograph of the support of FIG. 6, the pre-oxidation layer is clearly distinguished on a few grains of the support.

FIGS. 4, 5, 6 and 7 show that pre-oxidized substrates with a porosity gradient may be used during the manufacturing of <<SOFC>> or <<HTE>> cells, according to the general knowledge of the man skilled in the art.

The invention will now be described with reference to the following examples, given as an illustration and not as a limitation.

Example 1

60 porous metal supports with a thickness of 1.6 mm and a diameter of 25 mm are prepared by pressing a powder of alloy 1.4509 sifted to 50-100 μm and then by sintering.

The sintering is carried out at 1,200° C. for 3 hours under a controlled atmosphere (Ar+2% $H_2$) in the following way:

A temperature rise at a rate of 200° C./hour up to 500° C., and then a 1 hour plateau at 500° C. for promoting binder removal, and then a new rise in temperature at a rate of 300° C. per hour up to 1,200° C., and then again a 3 hour plateau at 1,200° C., and lowering of the temperature at a rate of 300° C. per hour down to room temperature.

The porosity obtained after sintering (measured by volume density and pycnometry) is from 27% to 30%.

Example 2

30 porous metal supports with a thickness of 3 mm and a diameter of 25 mm are prepared by pressing-sintering of a powder of alloy 1.4509. The powder is the same powder as the one of Example 1, obtained by atomization. The porosity after sintering is 27%.

Example 3

A porous metal support with a thickness of 1.6 mm and a diameter of 25 mm is prepared by pressing-sintering with the same alloy powder as the one of Examples 1 and 2.

The support has a porosity gradient with a lower sub-layer, with a thickness of 1 mm, and an upper sub-layer with a thickness of 0.6 mm.

The lower sub-layer has a porosity from 30% to 40%, a grain size from 100 μm to 200 μm, and a pore size from 30 μm to 40 μm.

The upper sub-layer has a porosity from 20% to 30%, a grain size from 10 μm to 50 μm, and a pore size from 5 μm to 10 μm.

Both sub-layers are co-sintered according to the procedure described in Example 1.

A layer permeation of $4.3.10^{-14}$ m$^2$ is obtained.

Example 4

In this example, a porous metal support with a porosity gradient is prepared.

This porous material has a diameter of 25 mm and is made from a powder of alloy 1.4509.

The upper layer has a thickness of about 200 μm and consists of a powder with a grain size of less than 50 μm.

The lower layer, with a thickness of about 1.2 mm, consists of a powder with a grain size from 200 to 350 μm.

This porous material is made by a method comprising the following successive steps:

Preparation of a Slurry:

Each of the powders is slurried according to the general conditions defined above, with 2% PVA and water, at 80° C. More specifically, the PVA (2 g) is dissolved in water (20 mL) at 80° C. with a magnetic stirrer. The powder is then incorporated into the mixture (100 g). Thus, a slurry is obtained. When the water has evaporated from the slurry, a dry paste is obtained which is passed through a sieve (of 350 μm).

Pressing:

In a first phase, the powder which will be in direct contact with the electrode, is incorporated into the matrix of the press, here the powder with the smallest grain size (powder with a grain size of less than 50 μm), and then the second powder with a grain size from 200-350 μm is incorporated thereto. The porous material is then pressed at 300 MPa.

Sintering:

A horizontal tubular oven of the AET brand is used under a controlled atmosphere in order to achieve sintering of this porous material in an argon atmosphere with 2% hydrogen, and according to the following thermal cycle:

Ramp 1: from 25° C. to 500° C. at a rate of 200° C./h;
Ramp 2: from 500° C. to 1,200° C. at a rate of 300° C./h; 2 hour plateau at 1,200° C.;
Ramp 3: from 1,200° C. to 25° C. at a rate of 300° C./h.

Figure 8:
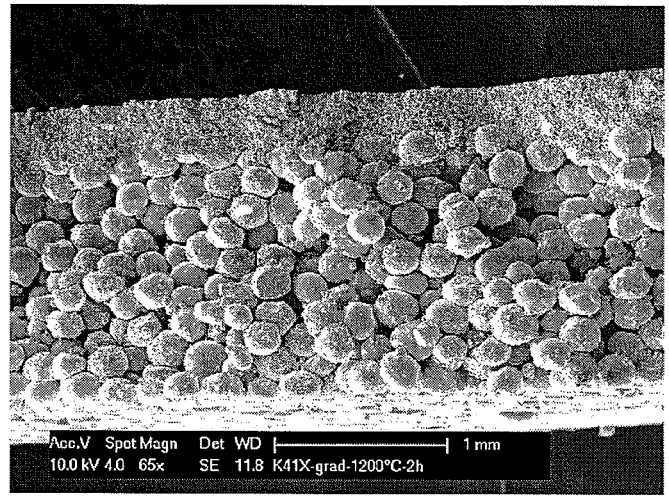
FIG. 8 is a view with an electron microscope of the porous metal support of Example 4. The scale illustrated in FIG. 8 is 1 mm.
Figure 9:
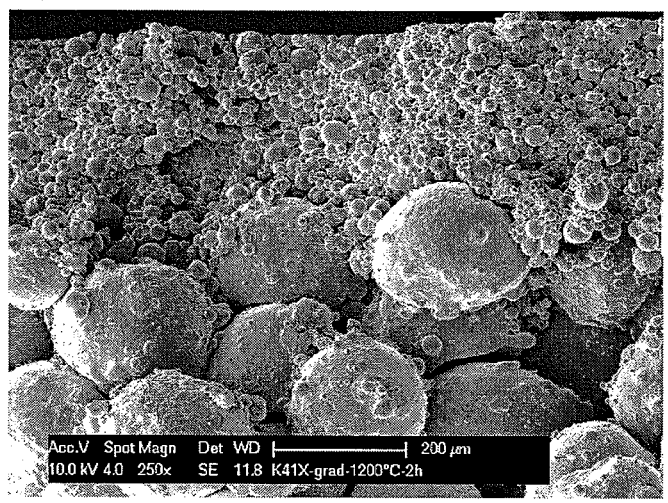
FIG. 9 is a view with an electron microscope of the porous metal support of Example 4. The scale illustrated in FIG. 9 is 200 µm.

FIGS. 8 and 9 show the nanostructure, i.e. the grain size and pores size of the two layers of the porous material with a porosity gradient.

FIG. 8 is a general view and FIG. 9 is a detailed view.

Example 5

In this example, a porous bi-material metal support is prepared.

This porous material has a diameter of 25 mm and is made from 2 materials having different chemical compositions:
 the upper layer with a thickness of about 150-200 μm consists of a nickel powder with a grain size of 25-60 μm;
 the lower layer, with a thickness of about 1.2 mm consists of a 1.4509 alloy powder with a grain size of 200-350 μm.

This porous material is made by a method comprising the following successive steps:

Preparation of a Slurry

Each of the powders is slurried according to the general conditions defined above, with 2% PVA and water, at 80° C. More specifically, the PVA (2 g) is dissolved in water (20 mL) at 80° C. with a magnetic stirrer. The powder is then incorporated into the mixture (100 g). Thus, a slurry is obtained. When water has evaporated from the slurry, a dry paste is obtained which is passed through a sieve (350 μm).

Pressing:

In a first phase, the powder which will be in direct contact with the electrode is incorporated into the matrix of the press, here the powder with the smallest grain size (a powder of a grain size of less than 50 μm) and then the second powder with a grain size from 200-350 μm is then incorporated. The porous material is then pressed at 300 MPa.

Sintering:

A horizontal AET tubular oven under a controlled atmosphere is used in order to carry out sintering of this porous material in an argon atmosphere with 2% hydrogen, and according to the following thermal cycle:
Ramp 1: from 25° C. to 500° C. at a rate of 200° C./h;
Ramp 2: from 500° C. to 1,200° C. at a rate of 300° C./h; 2 h plateau at 1,200° C.;
Ramp 3: from 1,200° C. to 25° C. at a rate of 300° C./h.

Figure 10:
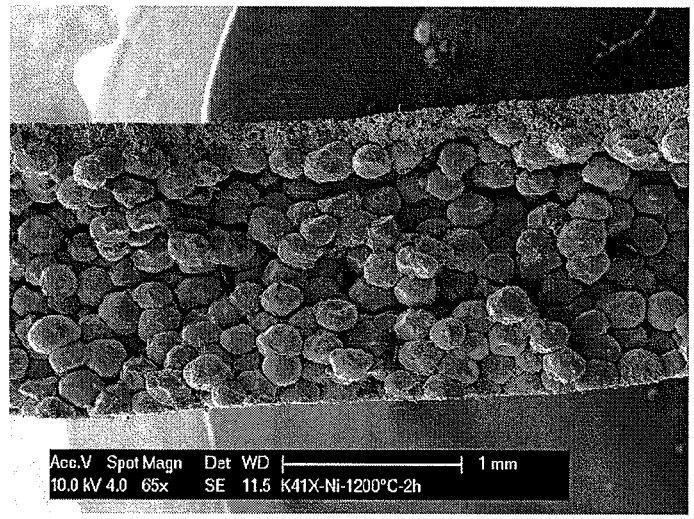
FIG. 10 is a view with an electron microscope of the porous metal support of Example 5. The scale illustrated in FIG. 10 is 1 mm.
Figure 11:
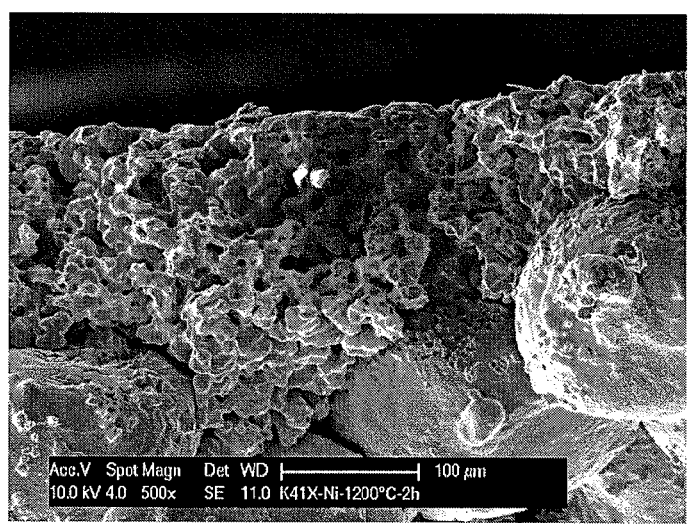
FIG. 11 is a view with an electron microscope of the porous metal support of Example 5. The scale illustrated in FIG. 11 is 100 µm.

FIGS. 10 and 11 show the nanostructure, i.e. the size of grains and pores of both layers of the porous bi-material.

FIG. 10 is a general view and FIG. 11 is a detailed view.

Example 6

In this example, a complete cell is made.

On a metal porous material as described in Example 1, a 1$^{st}$ electrode, the hydrogen electrode, is deposited by screen-printing.

It has a NiO-YSZ composition, with 45% by mass of NiO (nickel oxide) and 55% by mass of YSZ (zirconia stabilized with 8% molar of yttrium oxide). The thickness of this layer is about 50 μm and its porosity is of about 30%.

An electrolyte made of zirconia stabilized with scandium oxide (ScSZ) and with a thickness of 10 μm is then deposited by screen-printing.

Finally, an oxygen electrode of LSCF (strontium-doped lanthanum cobalto-ferrite) composition, of thickness 40 μm and of porosity 40% is deposited by screen-printing, with addition of an interfacial CGO (gadolinium cerium oxide) layer with a thickness of about 2 μm at the electrolyte-electrode interface.

Two sintering steps are used for making the complete cell according to common techniques.

Example 7

In this example, pre-oxidation of a porous metal support is performed and its resistance to subsequent oxidation is evaluated.

Two porous materials of diameter 25 mm, and a thickness 1.57 mm, consisting of a powder of alloy 1.4509 with a grain size comprised between 50 μm and 100 μm and a porosity of 33%, were subjected to a pre-oxidation treatment at 900° C. for 10 minutes in air.

The rise in temperature was carried out under an argon atmosphere+2% hydrogen at a rate of 300° C./hour.

At 900° C., a nitrogen sweep of the oven for 10 minutes was accomplished before introducing air for the pre-oxidation. The pre-oxidation at 900° C. in air lasted for 10 minutes, and then the samples were cooled under nitrogen, the temperature lowering ramp being 300° C./hour.

After the treatment, both samples (366 and 367 of the same composition) appeared iridescent (showing slight oxidation) and they have a mass increase Dm/m of 0.34 and of 0.44% (values for both of the tested samples 366 and 367 respectively).

The photographs of FIG. 12 show the visual aspect of a non-pre-oxidized sample (364 on the left) and of a sample pre-oxidized at 900° C. for 10 minutes (366 on the right). It is visually observed that the sample 366 has much darker color due to pre-oxidation.

The sample is oxidized in all its volume, all the grains are affected but over a thickness around each grain which may be evaluated with difficulty, but is much less than one micron.

The samples were then oxidized at 800° C. in air for 70 hrs. The rise in temperature was carried out under nitrogen at rate of 300° C./h. At 800° C., the oxidation was accomplished in air for 70 hours. Next the samples were cooled down under nitrogen, the temperature lowering ramp being 300° C./h.

After this oxidation, both samples had a gain in mass Dm/m of 1.07 and 1.52% respectively. As a comparison, a similar non-pre-oxidized sample 364 subjected to the same oxidation treatment has a gain in mass Dm/m of 2.58%, which is between 1.7 and 2.4 times greater.

The photographs of FIG. 13 show the visual aspect after oxidation at 800° C. for 70 hours of a non-pre-oxidized sample (364 on the left) and of a sample pre-oxidized at 900° C. for 10 min (366 on the right). It is visually observed that the sample 366 has less dark color, showing less significant oxidation consistent with the mass increases reported above.

The curve of FIG. 14 shows the gain in mass of the pre-oxidized samples during this oxidation treatment at 800° C. (366 and 367). As a comparison, the gain in mass of an identical non-pre-oxidized sample (364) is indicated.

The results are confirmed for longer durations ranging up to 220 hours.

The curves of FIG. 14 demonstrate that the gain in mass of the samples which have undergone preliminary pre-oxidation is clearly less significant than the gain in mass of the sample which has not undergone this preliminary pre-oxidation.

The samples having undergone preliminary pre-oxidation are therefore much more resistant to high temperature oxidation and for a long duration than samples which have not undergone the pre-oxidation treatment.

REFERENCES

[1] N. CHRISTIANSEN et al., "*Solid Oxide Fuel Cell Research and Development at Topsoe Fuel Cell AIS and Risø/DTU*" 8th European Fuel Cell Forum 2008, Lucerne, Switzerland, from Jun. 30 to Jul. 4, 2008, article B0201.
[2] P. SZABO et al., "*Measurement of High Temperature Leak Rates on Vacuum-Plasma-Sprayed SOFC electrolytes*", 7th European SOFC forum, Lucerne, Switzerland, Jul. 3-7, 2006, article P0419.
[3] P. SZABO et al., "*Status and Progress in Development of Metal Supported Light-Weight SOFC for Mobile Applications*", 8th European Fuel Cell Forum 2008, Lucerne, Switzerland, from Jun. 30 to Jul. 4, 2008, article B0603.
[4] S. VISCO et al., "*LBNL Activity Overview*", SECA Workshop, Feb. 20, 2003.
[5] US-A1-2003/0175439, "Process for making dense thin films".
[6] U.S. Pat. No. 6,605,316, "Structures and fabrication techniques for solid state electrochemical devices".
[7] U.S. Pat. No. 7,163,713, "Method for making dense crack free thin films".
[8] M. TUCKER et al., "*Performance of metal-supported SOFCs with infiltrated electrodes*", J. Power Sources 171 (2007) 477-482.
[9] GB-A-2,386,126A, "Impermeable sintered ceramic electrolyte layer for solid oxide fuel cell".
[10] Ceres Power Ltd, "*Development of innovative metal supported IT-SOFC technology*", DTI report F/01/00277/REP (2005).
[11] GB-A-2,400,723, "Solid oxide fuel cell for novel substrate and a method for fabricating the same".
[12] I. VILLAREAL et al., "*Metallic Support SOFC Cell Development in Ikerlan*", 8th European Fuel Cell Forum 2008, Lucerne, Switzerland, from Jun. 30 to Jul. 4, 2008, article B0607.
[13] R. HUI et al., "*High Performance Metal-supported SOFCs*", 8th European Fuel Cell Forum 2008, Lucerne, Switzerland, from Jun. 30 to Jul. 4, 2008, article B0604.
[14] WO-A2-2004/012287, "Metal-supported tubular fuel cell".
[15] US-A1-2006/0251947, "Bipolar plate supported solid oxide fuel cell with a sealed anode compartment".
[16] EP-A1-1353394, "Thin film solid oxide fuel cell (SOFC) and its method of production".
[17] WO-A2-2006/082057, "A method for producing a reversible solid oxide fuel cell"
[18] S. MOLINS et al., "*Evaluation of porous 430L stainless steel for SOFC operation at intermediate temperatures*", Journal of Power sources 181 (2008) 31-37.

The invention claimed is:

1. A partly oxidized substrate formed by subjecting a substrate made of a porous metal or metal alloy comprising particles of at least one metal or metal alloy bound by sintering, the substrate comprising: a first main surface; and a second main surface, wherein the porosity of the substrate gradually changes from the first main surface to the second main surface, and wherein the substrate is pre-oxidized by an oxidizing gas and substantially all the particles of the substrate are partly oxidized.

2. The substrate according to claim 1, wherein the partial oxidation is carried out at a temperature of greater than about 600° C. and for a duration less than about 20 minutes.

3. The substrate according to claim 1, wherein the first main surface and the second main surface are planar and parallel surfaces.

4. The substrate according to claim 1, wherein the first main surface is an upper surface and the second main surface is a lower surface of the substrate.

5. The substrate according to claim 1, wherein the porosity of the substrate decreases from the second main surface to the first main surface.

6. The substrate according to claim 5, wherein the substrate comprises at least one high porosity layer in contact with the second main surface and a low porosity layer in contact with the first main surface, wherein the high porosity layer and the low porosity layer are interposed between the first main surface and the second main surface.

7. The substrate according to claim 6, wherein the high porosity layer has a porosity from about 25% to about 65%, and the low porosity layer has a porosity from about 10% to about 40%, and wherein the low porosity layer has a porosity less than the porosity of the high porosity layer.

8. The substrate according to claim 6, wherein the high porosity layer comprises large pores with a size of more than about 20 μm to about 50 μm, and the low porosity layer comprises small pores with a size from about 1 μm to about 20 μm.

9. The substrate according to claim 6, wherein the high porosity layer has a thickness of about 100 μm to about 5 mm and the low porosity layer has a thickness from about 20 μm to about 500 μm.

10. The substrate according to claim 1, wherein the metal or alloy is selected from the group consisting of iron, iron-based alloys, chromium, chromium-based alloys, iron-chromium alloys, stainless steels, nickel, nickel-based alloys, nickel-chromium alloys, alloys containing cobalt, alloys containing manganese, aluminium and alloys containing aluminium.

11. The substrate according to claim 6, wherein the low porosity layer is made of a first metal or metal alloy and the high porosity layer is made of a second metal or metal alloy, or wherein the high porosity layer and the low porosity layer are made of a same metal or metal alloy.

12. The substrate according to claim 11, wherein the first metal or alloy is selected from the group consisting of chromium, chromium-based alloys, iron-chromium alloys, stainless steels, nickel, nickel-based alloys, nickel-chromium alloys, and the second metal or alloy is selected from the group consisting of chromium, chromium-based alloys, iron-chromium alloys, stainless steels, nickel, nickel-based alloys, nickel-chromium alloys.

13. The substrate according to claim 6, wherein at least one intermediate layer is disposed between the high porosity layer and the low porosity layer, and wherein the at least one intermediate layer has a porosity less than the porosity of the high porosity layer and greater than the porosity of the low porosity layer.

14. The substrate according to claim 1, wherein partial oxidation is carried out at a temperature from about 600° C. to about 1,600° C. for a duration of about 1 to about 20 minutes.

15. A method of preparing a substrate of claim 1, the method comprising:
  successively depositing at least two layers of metal powders having increasing grain sizes in a vertical mold, the at least two layers having a size and shape corresponding to a size and shape of the substrate;
  pressing the at least two layers to obtain a green porous substrate;

separating the green porous substrate from the mold;
sintering the green porous substrate; and
partially oxidizing the substrate by placing the substrate in contact with an oxidizing gas.

16. The method according to claim 15, wherein partial oxidation is carried out at a temperature greater than about 600° C. and for a duration less than about 20 minutes.

17. The method according to claim 15, wherein the at least two layers include a lower layer and an upper layer, the method further comprising depositing the lower layer comprising a powder of large grain size first, and depositing the upper layer comprising a powder of small grain size second, or vice versa.

18. The method according to claim 15 wherein the powder of large grain size has a grain size of more than about 50 μm to about 500 μm, and the powder of small grain size has a grain size from about 1 μm to about 50 μm.

19. The method according to claim 17, wherein at least one intermediate layer comprises powders having an intermediate grain size between the grain size of the powder constituting the lower layer and the upper layer, and wherein the grain size of the at least one intermediate layer is configured to have a grain size such that the grain size of the layers gradually decreases from the layer having the large grain size to the layer having the small grain size.

20. The method according to claim 19, wherein the at least one intermediate layer includes 1 to 8 intermediate layers.

21. The method according to claim 17, wherein each of the layers, including the intermediate layers, consist of the same alloy or metal, or wherein at least one of the layers consist of a metal or alloy different from that of the other layers.

22. The method according to claim 15, wherein pressing the at least two layers includes uniaxial compression.

23. The method according to claim 15, wherein pressing the at least two layers includes applying a pressure from about 10 to about 700 MPa.

24. The method according to claim 15, wherein sintering is carried out at a temperature between the minimum temperature for starting the sintering and the total densification temperature of the substrate.

25. The method according to claim 24, wherein the sintering temperature is from about 600° C. to about 1,600° C.

26. The method according to claim 15, wherein partially oxidizing the substrate comprises partially oxidizing the substrate at a temperature from about 600° C. to about 1600° C. for a duration of about 1 to about 20 minutes.

27. A high temperature electrolyzer cell or a fuel cell comprising a partially oxidized substrate according to claim 1.

28. The high temperature electrolyzer cell or fuel cell according to claim 27, wherein a water or hydrogen electrode, an electrolyte, and an oxygen electrode are successively stacked on the partially oxidized substrate.

29. The high temperature electrolyzer cell or fuel cell according to claim 27, wherein an oxygen electrode, an electrolyte, and a hydrogen or water electrode are successively stacked on the partially oxidized substrate.

* * * * *